United States Patent
Bhooshan et al.

(10) Patent No.: US 9,455,233 B1
(45) Date of Patent: Sep. 27, 2016

(54) SYSTEM FOR PREVENTING TAMPERING WITH INTEGRATED CIRCUIT

(71) Applicant: FREESCALE SEMICONDUCTOR, INC., Austin, TX (US)

(72) Inventors: Rishi Bhooshan, Ghaziabad (IN); Mohit Arora, Austin, TX (US); Rakesh Pandey, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/956,406

(22) Filed: Dec. 2, 2015

(51) Int. Cl.
*H01L 23/00* (2006.01)
*H01L 23/58* (2006.01)

(52) U.S. Cl.
CPC ........... *H01L 23/573* (2013.01); *H01L 23/585* (2013.01)

(58) Field of Classification Search
CPC . H01L 23/573; H01L 23/585; Y10S 261/84; Y10S 257/922
USPC ........................................................ 257/922
See application file for complete search history.

(56) References Cited

U.S. PATENT DOCUMENTS

| | | | |
|---|---|---|---|
| 5,383,143 A | 1/1995 | Crouch et al. | |
| 5,389,738 A | 2/1995 | Piosenka et al. | |
| 5,446,864 A | 8/1995 | Burghardt | |
| 5,457,748 A | 10/1995 | Bergum | |
| 6,002,501 A | 12/1999 | Smith | |
| 6,646,565 B1 | 11/2003 | Fu | |
| 6,946,960 B2 | 9/2005 | Sisson | |
| 7,065,656 B2 * | 6/2006 | Schwenck | G06F 21/87 713/194 |
| 7,180,008 B2 | 2/2007 | Heitman | |
| 7,498,644 B2 | 3/2009 | Shapiro | |
| 7,868,441 B2 | 1/2011 | Eaton | |
| 7,923,830 B2 | 4/2011 | Pope | |
| 7,947,911 B1 | 5/2011 | Pham | |
| 7,953,989 B1 | 5/2011 | Hsiang | |
| 8,127,151 B2 | 2/2012 | Nelson | |
| 8,240,038 B1 | 8/2012 | Pham | |
| 8,689,357 B2 | 4/2014 | Arora et al. | |
| 8,896,086 B1 * | 11/2014 | Arora | G06F 21/86 257/428 |
| 2002/0002683 A1 | 1/2002 | Benson | |
| 2003/0008432 A1 | 1/2003 | Kux et al. | |
| 2004/0227205 A1 | 11/2004 | Walmsley | |
| 2004/0236961 A1 | 11/2004 | Walmsley | |
| 2004/0252053 A1 | 12/2004 | Harvey | |

(Continued)

OTHER PUBLICATIONS

Xavier Charvet, Herve Pelletier, "Improving the DPA attack using Wavelet transform", downloaded from http://csrc.nist.gov/groups/STM/cmvp/documents/fips140-3/physec/physecdoc.html, undated (downloaded Mar. 5, 2012).

(Continued)

*Primary Examiner* — Amar Movva
*Assistant Examiner* — Omar Mojaddedi
(74) *Attorney, Agent, or Firm* — Charles E. Bergere

(57) ABSTRACT

A system for generating a tamper detection signal indicating tampering with one or more circuits of an integrated circuit (IC) includes both a static wire mesh and an active wire mesh. The wire meshes can be formed in the same layer over the circuits to be protected or in different layers. The wire meshes also may cover the entire chip area or only predetermined areas, such as over secure memory and register areas. The wire meshes are connected to a tamper detection module, which monitors the meshes and any signals transmitted via the meshes to detect attempts to access the protected circuits via micro-probing.

17 Claims, 4 Drawing Sheets

(56) References Cited

U.S. PATENT DOCUMENTS

| | | | |
|---|---|---|---|
| 2007/0126100 A1* | 6/2007 | Mizuno | G06F 21/86 257/679 |
| 2009/0077669 A1 | 3/2009 | Buer | |
| 2010/0192014 A1 | 7/2010 | Mejdrich | |
| 2012/0179921 A1* | 7/2012 | Christianson | G08B 29/046 713/194 |
| 2013/0104252 A1 | 4/2013 | Yanamadala | |
| 2015/0114122 A1* | 4/2015 | Soles | G08B 13/126 73/584 |

OTHER PUBLICATIONS

Maxim: "Secure supervisor IC has active tamper detection", EE Times, Feb. 5, 2009.

Anon, "Infineon / ST Mesh Comparison", Flylogic's Analytical Blog, http://www.flylogic.net/blog/?p=86, May 9, 2013.

* cited by examiner

SYSTEM FOR PREVENTING TAMPERING WITH INTEGRATED CIRCUIT

BACKGROUND OF THE INVENTION

The present invention generally relates to integrated circuits, and more particularly, to a system for preventing tampering of an integrated circuit.

Integrated circuits (ICs), such as those used in set-top boxes, engine control units (ECUs), and cryptographic systems, often store sensitive information including personal data, financial transaction authorization codes, security passwords, and secure session keys, and thus are prone to unauthorized access. A known technique to gain access to information stored in an IC is micro-probing. Micro-probing involves forming an electrical contact with the IC by placing fine-tipped probe needles directly on the point of interest of the IC, or on an area of the IC to which the point of interest is connected. The probe needles are held by a micromanipulator that is controlled to precisely land the probe needle on the IC.

To protect ICs from micro-probing, static wire meshes have been designed that are placed close to the ICs. In a static wire mesh, first and second wires are respectively connected to power and ground, laid out in a mesh pattern, and monitored by a tamper detection module, which detects if either of the wires is broken, which it takes as an indication of an unauthorized attempt to probe the integrated circuit. For example, contact of the a probe needle with either of the wires causes corresponding tampering lines to be activated, which in turn sets off a self-erase sequence that erases the sensitive information in the IC.

Certain ways have been devised to bypass the static wire mesh in order to probe the integrated circuit, so active wire meshes have been deployed, where a serial bit stream is run through wires that form a mesh. It is much more difficult to compromise an active wire mesh. Even so, it would be advantageous to have a more robust circuit protection system.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements. As will be understood by those of skill in the art, the drawings are not to scale in order to highlight certain features of the invention.

DETAILED DESCRIPTION

Figure 2:
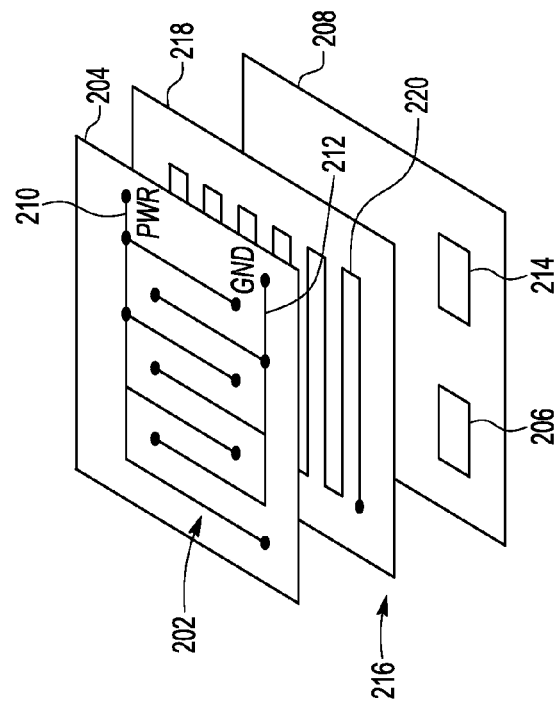
FIG. 2 is a side elevational view of a tamper detection system of an integrated circuit in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment, in a multi-layer integrated circuit (IC), the present invention provides a tamper detection system for protecting one or more circuits of the IC from being accessed by micro-probing. The tamper detection system comprises a first, static wire mesh formed in a first layer overlying the one or more circuits to provide static protection to the one or more circuits. The static wire mesh comprises first wires connected to a power supply and second wires connected to ground. A second, active wire mesh comprises at least a third wire formed in a second layer overlying the one or more circuits to provide active protection to the one or more circuits. A tamper detection module is connected to the first and second wire meshes for detecting breaks in the meshes. A first terminal of the third wire of the second mesh is connected to a first output terminal of the tamper detection module for receiving a first serial bit stream therefrom, and a second terminal of the third wire is connected to a first input terminal of the tamper detection module for providing the first serial bit stream back to the tamper detection module, where the transmitted and received bit streams are compared. The tamper detection module generates a tamper detection signal if either of the active or static meshes is compromised. The tamper detection signal triggers zeroization of data stored by the protected circuits.

Various embodiments of the present invention provide a system for generating a tamper detection signal indicating tampering with one or more circuits of an IC. The system includes a tamper detection module and both static and active wire meshes connected to the tamper detection module. The wire meshes are placed at predefined distances from the protected circuits of the IC. The protected circuits are associated with memory modules, e.g., memory arrays, register arrays, etc., of the IC used to store sensitive information. The tamper detection module generates serial bit streams based on a predetermined algorithm. The serial bit streams comprise a random pattern of bits that are repeated at a predefined frequency. The serial bit streams traverse the active wire mesh and are returned to the tamper detection module for comparison to determine if the active wire mesh has been altered. That is, a difference in the input and output serial bit streams implies an unauthorized attempt to access the contents of the protected circuits or a breach in the wire mesh. The static wire mesh, comprising an array of wires connected to a power supply and an array of wires connected to ground, also is monitored by the tamper detection module to determine if the meshes have been broken. The tamper detection module generates a tamper detection signal, which sets-off an erase sequence for erasing contents of the protected circuits.

Figure 1:
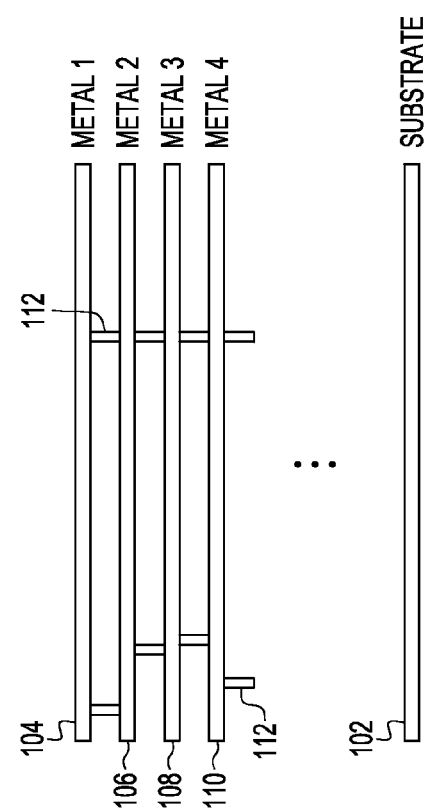
FIG. 1 is a cross-sectional side view illustrating an integrated circuit having a plurality of metal layers in accordance with an embodiment of the present invention.

Referring now to FIG. 1, a simplified cross-sectional side view of a multi-layer integrated circuit (IC) 100 is shown.

The IC 100 comprises a substrate 102, such a silicon substrate, which is well known to those of skill in the art. Circuits are formed on the substrate using known semiconductor fabrication techniques to form circuitry therein. The circuits may comprise, for example, a system on a chip (SOC), an application specific integrated circuit (ASIC), etc., and include various circuits such as memory modules, seas of gates, etc. Also as is known to those of skill in the art, a number of metal layers, such as metal layers 104-110, are formed over the substrate, separated by dielectric layers. The metal layers 104-110 may be connected with vias, such as vias 112. In accordance with the present invention, the IC 100 includes a tamper detection system that comprises a static mesh, an active mesh, and a tamper detection module. The tamper detection module is formed along with the other circuitry of the IC 100 and the wire meshes are formed in one or more of the metal layers 104-110. While in typical semiconductor design metal1 is known as the metal layer closest overlying the substrate, the fact that metal1 is shown in FIG. 1 as the furthest overlying metal layer from the substrate is simply for ease of explanation and there is no implication that the metal layers are different than for typical semiconductor devices.

FIG. 2 is a cross-sectional, side, elevational view of a portion of an IC 200 in accordance with an embodiment of the present invention. The IC 200 has a first, static wire mesh 202 formed in a first metal layer 204 overlying one or more circuits 206 of the IC 200 that are formed in lower layer(s) 208. The circuits 206 store protected information and the static mesh 202 provides static protection to the circuits 206. In this embodiment, the static wire mesh 202 comprises first wires 210 connected to a power supply (not shown) and second wires 212 connected to ground. The static wire mesh 202 also is connected to a tamper detection module 214 formed in the lower layer(s).

In this embodiment, the first and second wires 210 and 212 run parallel with each other and are connected to the tamper detection module by way of vias (not shown). The first and second wires 210 and 212 preferably are separated by a distance such that if a probe tip tried to breach the mesh 202, the tip would contact one of the first wires 210 and an adjacent second wire 212, thereby causing a short circuit detectable by the tamper detection module 214. In a preferred embodiment, the wires 210 and 212 are wide wires. That is, in one preferred embodiment, the wires used to form the mesh 202 have a maximum width as defined for the technology node (e.g., C55, C40, C28, etc.) of the IC 200, and it also is preferred that the wires 210 and 212 are routed at minimum pitch for the technology node of the IC 200.

The IC 200 also has a second, active wire mesh 216 formed in a second metal layer 218 and overlying the one or more circuits 206 of the IC 200. In this embodiment, the second metal layer 218 is different than the first metal layer 204, and the active wire mesh 216 comprises at least a third wire 220 that may be a continuous wire that runs from one side of the layer 218 in a zig-zag pattern to an opposing side of the layer 218, with spacing between the lengths of the third wire 220 are parallel with each other and running along a length of layer 218 being such that a microprobe trying to breach the mesh will contact the third wire 220. One end of the third wire 220 is connected to an output terminal of the tamper detection module 214 (by way of vias, not shown) and the other end of the wire 220 is connected to an input terminal of the tamper detection module 214. Like the first and second wires 210 and 212, in a preferred embodiment the third wire 220 is a wide wire routed at minimum pitch for the technology node of the IC 200.

As discussed in U.S. Pat. No. 8,689,357 of Freescale Semiconductor, Inc., which is hereby incorporated in its entirety, a serial bit stream may be transmitted over the third wire 220 to/from the tamper detection module 214, and the tamper detection module compares the transmitted bit stream with the received bit stream to determine if an attempt has been made to compromise the mesh 216. As previously noted, the tamper detection module 214 is formed in a lower layer 208 of the IC 200 and connected to the static and active meshes 202 and 216 for detecting breaks in the meshes. If the tamper detection module detects that one of the meshes 202 and 216 has been breached or tampered with, then the tamper detection module 214 activates a tamper detection signal that is used to initiate a memory erase sequence for erasing one or more values stored in the memory modules (including any memory circuits like flip-flops or registers that store protected data).

Figure 3:
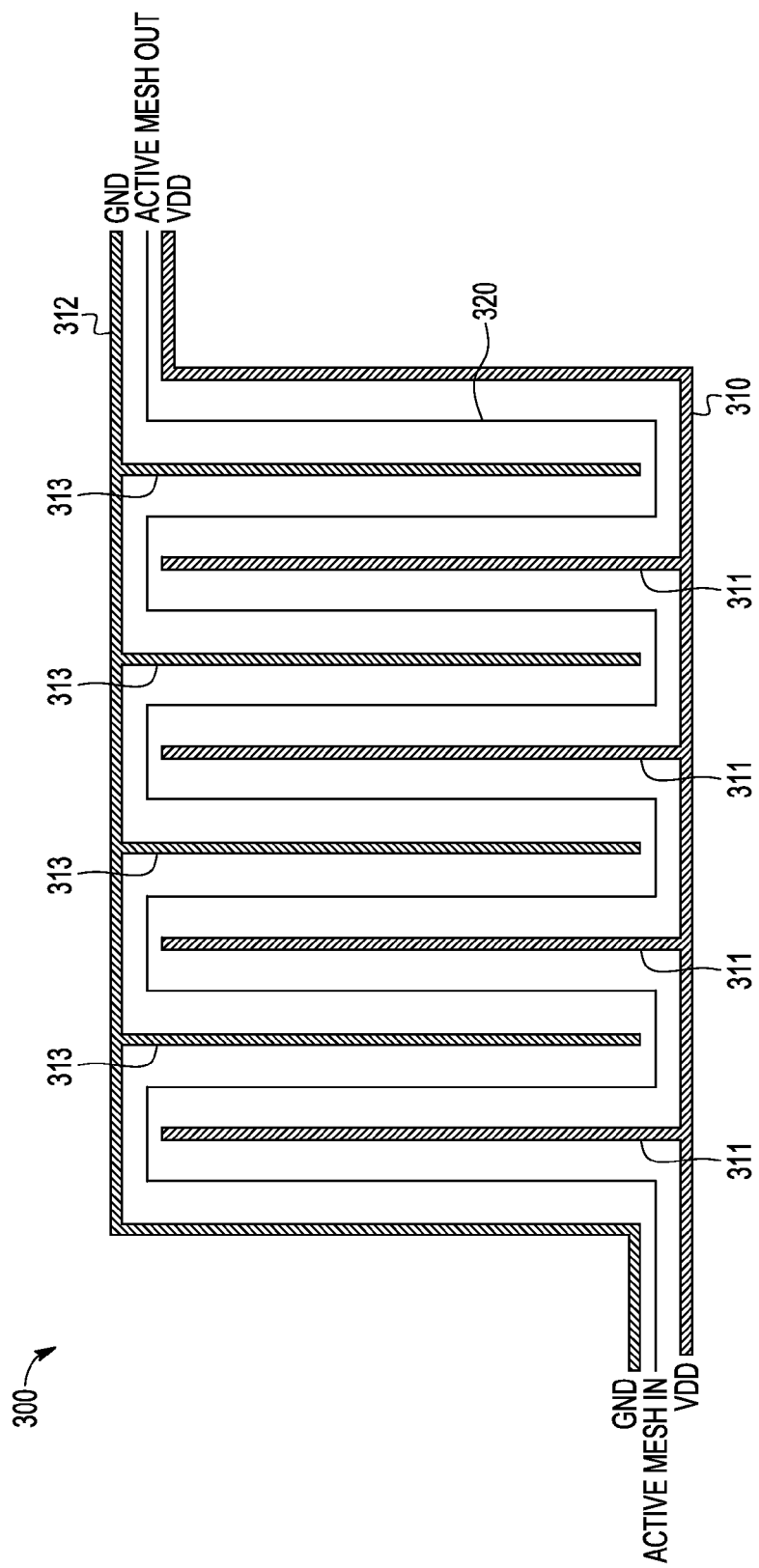
FIG. 3 is a top plan view of a tamper detection system in accordance with an embodiment of the present invention.

FIG. 3 is a top plan view of a metal layer of an IC 300 in accordance with an embodiment of the present invention in which static and active meshes of a tamper detection system are formed in a single metal layer. In this embodiment, the tamper detection system includes a first wire 310 that is connected to a power supply (VDD), a second wire 312 that is connected to ground (VSS), and a third wire 320 having both its ends connected to a tamper detection module. Thus, the first and second wires 310 and 312 provide static protection and the third wire 320 provides active protection, and the three wires together form a combined active and static mesh. In this embodiment, the first wire 310 has a main branch and fingers 311 that extend from and are perpendicular to the main branch. The second wire 312 also has a main branch and fingers 313 that extend from and are perpendicular to its main branch. The fingers 311 and 313 of the first and second wires 310, 312 are parallel with each other (and perpendicular to their main branches). The distal ends of the fingers 311 and 313 may be connected by way of vias to respective power and ground signals in another metal layer. The third wire 320 then zig-zags between the fingers 311 and 313 such the static and active protection systems form a single mesh. Adjacent wires (or fingers thereof) are spaced such that it would be difficult to insert a probe therebetween. Although the third wire 320 of the active mesh is shown as thinner than the wires 310 and 312 of the static mesh, the third wire 320 may be the same width as the wires 310 and 312.

Figure 4A:
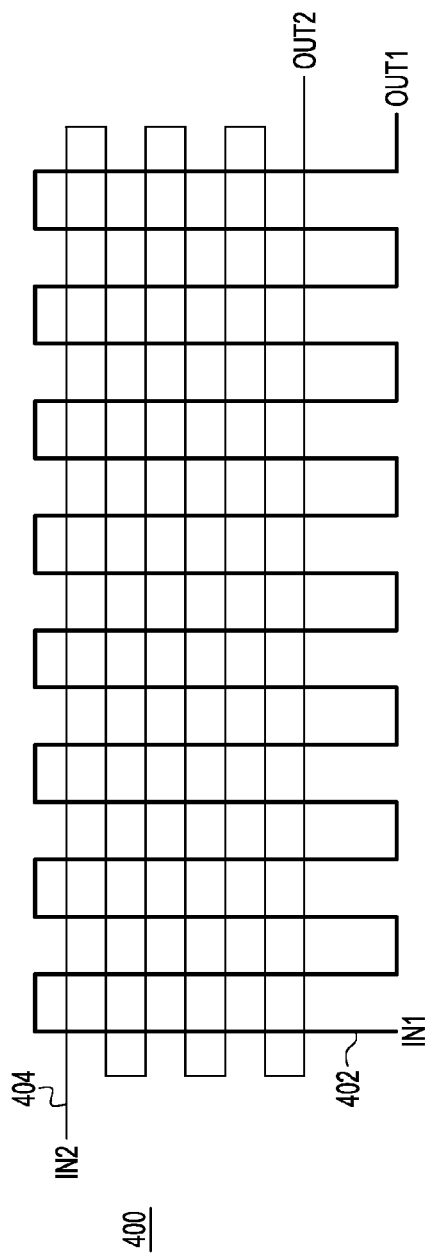
FIG. 4A is a top plan view and FIG. 4B is a side elevational view of a portion of a tamper detection system in accordance with an embodiment of the present invention.
Figure 4B:
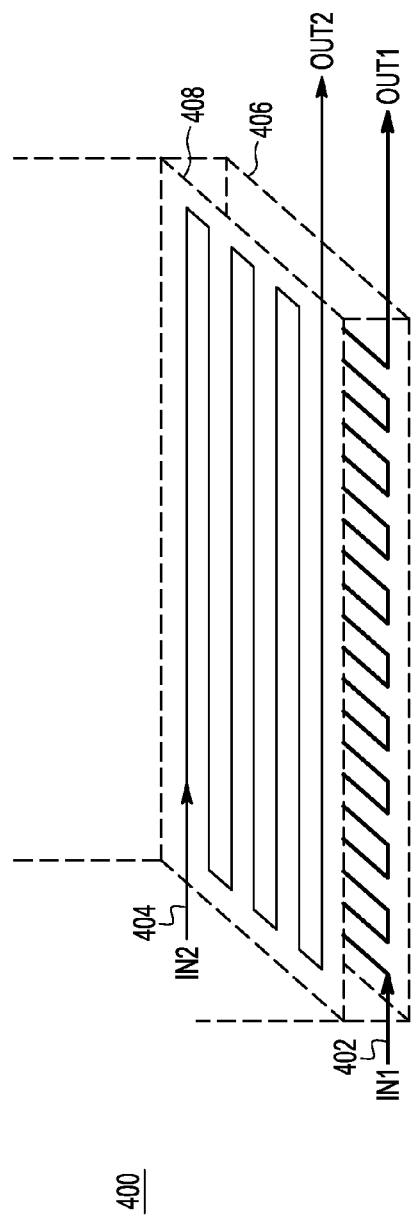

FIG. 4A is a top plan view of a portion of a wire mesh protection system 400 in accordance with an embodiment of the present invention. The system 400 includes a first wire 402 that traverses a metal layer in a zig-zag pattern as shown, and a second wire 404 that runs in a zig-zag pattern that is orthogonal to the pattern of the first wire, such that the two wires are crisscrossed. FIG. 4B is a side elevational view of the system 400 and first and second wires 402 and 404. As can be seen, the first wire 402 is formed in a first metal layer 406 and the second wire 404 is formed in a second metal layer 408. By placing the first and second wires 402 and 404 in separate metal layers, the wires 402 and 404 can crisscross, making it very difficult for microprobing to be performed. The first and second wires 402 and 404 may comprises either a static mesh or a dynamic mesh. That is, for a static mesh, one of the first and second wires 402, 404 would be connected to ground and the other to a power supply. A dynamic mesh could then be formed in a third metal layer either above or below the first and second layers 406 and 408. On the other hand, for a dynamic mesh, both of the wires 402 and 404 are connected to a tamper detection module and receive bit streams and then provide the bit streams back to the tamper detection module for comparisons.

Figure 5:
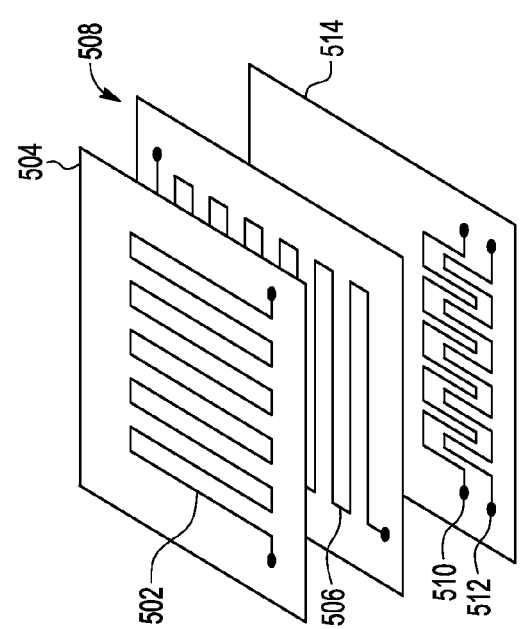
FIG. 5 is a side elevational view of a tamper detection system of an integrated circuit in accordance with another embodiment of the present invention.

FIG. 5 is a side elevational view of a portion of a tamper detection system 500 in accordance with an embodiment of the present invention. The system 500 includes a first wire 502 formed in a first metal layer 504, a second wire 506 formed in a second metal layer 508, and third and fourth wires 510 and 512 formed in a third metal layer 514. The first through third metal layers 504, 508 and 514 are adjacent overlying layers, as shown, and the integrated circuitry (to be protected) as well as a tamper detection module, are formed in other layers of the integrated circuit. The first and second wires 502 and 506 form a static wire mesh, while the third and fourth wires 510 and 512 form a dynamic wire mesh. Thus, the first and second wires 502 and 506 are respectively connected to power and ground and monitored by a tamper detection module, and the third and fourth wires 510 and 512 each have input and output terminals connected to the tamper detection module for receiving from and providing to the tamper detection module, a serial bit stream. In the embodiment shown, and as discussed in U.S. Pat. No. 8,689,357 of Freescale Semiconductor, Inc., which is hereby incorporated in its entirety, the third and fourth wires are parallel with each other. The first and second serial bit streams may have a predefined repetition frequency, and the second serial bit stream may be a complement of the first serial bit stream. Also, the relative positions of the three metal layers 504, 508, 514 are shown relative to each other, but in one embodiment, the third layer 514 is located above the second layer 508 and the second layer 508 is closer to the protected circuits of the integrated circuit.

In another embodiment, the third and fourth wires 510 and 512 are formed in two separate, spaced layers, for example, as shown in FIGS. 4A and 4B so that the wires 510 and 512 may be perpendicular to each other. The third and fourth wires 510 and 512 also can be offset from each other and have different densities. That is, the spacing of the lengths of the wire 510 as it traverses a metal layer may be different from the wire 512 as it traverses an adjacent metal layer. This helps to provide lower wire impedance due to less denser mesh, thereby saving power consumption since in some embodiments the mesh is powered separately by a coin cell or equivalent for a secure applications.

Figure 6:
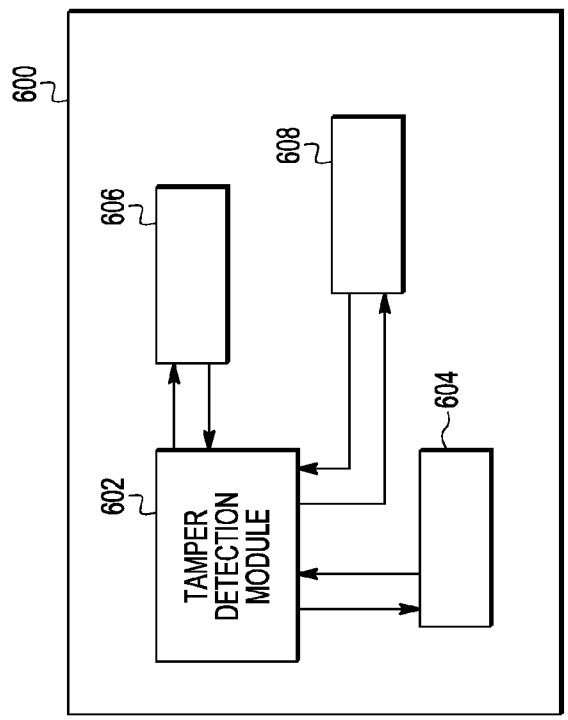
FIG. 6 is a schematic diagram of an integrated circuit including a tamper detection module and a plurality of mesh protection systems in accordance with an embodiment of the present invention.

FIG. 6 is a top plan view of layer of an integrated circuit 600 having a tamper detection module 602 and a plurality of wire mesh protection systems, three of which are shown 604-608. The wire mesh protection systems 604-608 each preferably comprises a combination of a static mesh and an active mesh. As can be seen, the three wire mesh protection systems 604-608 are spaced from each other and located over different parts of an underlying integrated circuit. Thus, in this embodiment, the mesh protection systems are located above only a selected few of the one or more circuits of the IC. In other embodiments, either both static and active meshes may cover an entire chip surface area. In yet another embodiment, a static mesh may overlay all of the integrated circuitry while an a separate layer, one or more active meshes are proved that overlie only selected circuits of the integrated circuitry.

By providing a plurality of smaller meshes, less power is consumed by the tamper detection system, and less physical area is required.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. In a multi-layer integrated circuit (IC), a tamper detection system for protecting one or more circuits of the IC, the tamper detection system comprising:
   a first, static wire mesh formed in a first layer overlying the one or more circuits to provide static protection to the one or more circuits, wherein the static wire mesh comprises first wires connected to a power supply and second wires connected to ground;
   a second, active wire mesh comprising at least a third wire formed in a second layer overlying the one or more circuits to provide active protection to the one or more circuits; and
   a tamper detection module connected to the first and second wire meshes for detecting breaks in said meshes, wherein a first terminal of the third wire of the second mesh is connected to a first output terminal of the tamper detection module for receiving a first serial bit stream therefrom, and a second terminal of the third wire is connected to a first input terminal of the tamper detection module for providing the first serial bit stream back to the tamper detection module, wherein the tamper detection module actives a tamper detection signal when a break in one of the first and second wire meshes is detected.

2. The tamper detection system of claim 1, wherein the first and second layers are the same layer.

3. The tamper detection system of claim 1, wherein the first layer is a different layer than the second layer.

4. The tamper detection system of claim 1, wherein the first wires and the second wires are perpendicular to each other.

5. The tamper detection system of claim 1, wherein the first layer comprises two spaced layers such that the first and second wires are formed in two spaced layers of the IC.

6. The tamper detection system of claim 5, wherein the second layer is spaced from the first layer such that the first, second and third wires are formed in separate, spaced layers of the IC.

7. The tamper detection system of claim 1, wherein the second mesh comprises a fourth wire formed in a third layer overlying and spaced from the second layer, wherein the third and fourth wires form a mesh, and wherein a first terminal of the fourth wire is connected to a second output terminal of the tamper detection module for receiving a second serial bit stream therefrom, and a second terminal of the fourth wire is connected to a second input terminal of the tamper detection module for providing the second serial bit stream to the tamper detection module.

8. The tamper detection system of claim 7, wherein the third and fourth wires are perpendicular to each other.

9. The tamper detection system of claim 8, wherein the third and fourth wires are offset from each other.

10. The tamper detection system of claim 9, wherein the third and fourth wires are laid out in patterns and the pattern of the fourth wire is denser than the pattern of the third wire.

11. The tamper detection system of claim 10, wherein the third layer is above the second layer, wherein the second layer is closer to the protected circuits.

12. The tamper detection system of claim 7, wherein the first and second serial bit streams have a predefined repetition frequency.

13. The tamper detection system of claim 7, wherein the second serial bit stream is a complement of the first serial bit stream.

14. The tamper detection system of claim 1, wherein the first and second meshes overlay substantially all of the circuits of the IC.

15. The tamper detection system of claim 1, wherein the second mesh is located above only a selected few of the one or more circuits of the IC.

16. The tamper detection system of claim 1, wherein the one or more circuits are associated with memory modules of the IC.

17. The tamper detection system of claim 16, wherein the tamper detection module activates a memory erase sequence for erasing one or more values stored in the memory modules based on the tamper detection signal.

* * * * *